US012680608B2

(12) United States Patent
Nakamura

(10) Patent No.: US 12,680,608 B2
(45) Date of Patent: Jul. 14, 2026

(54) HYDRAULIC CONTROL APPARATUS OF AUTOMATIC TRANSMISSION, AND VEHICLE

(71) Applicant: ISUZU MOTORS LIMITED, Yokohama (JP)

(72) Inventor: Shusei Nakamura, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 19/259,212

(22) Filed: Jul. 3, 2025

(65) Prior Publication Data

US 2026/0055811 A1 Feb. 26, 2026

(30) Foreign Application Priority Data

Aug. 23, 2024 (JP) ................................. 2024-142013

(51) Int. Cl.
*F16H 61/02* (2006.01)
*F16H 61/00* (2006.01)
(52) U.S. Cl.
CPC ..... *F16H 61/0206* (2013.01); *F16H 61/0021* (2013.01); *F16H 61/0251* (2013.01);
(Continued)
(58) Field of Classification Search
CPC ............. F16H 61/0021; F16H 61/0251; F16H 2061/0096; F16H 2061/0258
See application file for complete search history.

(56) References Cited

U.S. PATENT DOCUMENTS 5,931,885 A * 8/1999 Kubo .................... F16H 61/061
477/143
6,813,551 B2 * 11/2004 Taniguchi ......... F16H 61/66259
701/58
(Continued)

FOREIGN PATENT DOCUMENTS

JP 2008-069946 A 3/2008
JP 2011-047461 A 3/2011
JP 2011-256987 A 12/2011

*Primary Examiner* — Huan Le
(74) *Attorney, Agent, or Firm* — The Roy Gross Law Firm, LLC; Roy D. Gross

(57) ABSTRACT

An object of the present disclosure is to provide a hydraulic control apparatus of an automatic transmission allowing appropriate adjustment of feelings during shifting. Therefore, the hydraulic control apparatus of the automatic transmission includes: an electromagnetic proportional valve performing pressure regulation of operating oil; a pressure sensor detecting an oil pressure of the operating oil; and a control apparatus causing a hydraulic clutch to transition from an opened state to an engaged state by outputting, according to a control map stored in advance, a pulsed control current having a predetermined current value and a predetermined application time to the electromagnetic proportional valve. The control apparatus performs correction processing of correcting the predetermined current value and application time such that the oil pressure of the operating oil supplied to the hydraulic clutch is within a predetermined target pressure range when outputting the pulsed control current to the electromagnetic proportional valve.

7 Claims, 7 Drawing Sheets

(52) U.S. Cl.
CPC ................ *F16H 2061/0096* (2013.01); *F16H 2061/0258* (2013.01)

(56)                   References Cited

U.S. PATENT DOCUMENTS 8,504,262  B2 *   8/2013  Sasahara ............... F16H 61/061
                                                             192/3.57
2008/0071449  A1      3/2008  Kondo

* cited by examiner

CONTROL MAP
(BEFORE UPDATE)

| OIL TEMPERATURE [° C] | 0 | 20 | 40 | 60 | 80 | 100 |
|---|---|---|---|---|---|---|
| APPLIED CURRENT Ip | a | b | c | d | e | f |
| APPLICATION TIME Δt1 | A | B | C | D | E | F |

CONTROL MAP
(AFTER UPDATE)

| OIL TEMPERATURE [° C] | 0 | 20 | 40 | 60 | 80 | 100 |
|---|---|---|---|---|---|---|
| APPLIED CURRENT Ip | a' | b' | c' | d' | e' | f' |
| APPLICATION TIME Δt1 | A' | B' | C' | D' | E' | F' |

HYDRAULIC CONTROL APPARATUS OF AUTOMATIC TRANSMISSION, AND VEHICLE

CROSS REFERENCE TO RELATED APPLICATIONS

This application is entitled to (or claims) the benefit of Japanese Patent Application No. 2024-142013, filed on Aug. 23, 2024, the disclosure of which including the specification, drawings and abstract is incorporated herein by reference in its entirety.

TECHNICAL FIELD

The present disclosure relates to a hydraulic control apparatus of an automatic transmission, and a vehicle.

BACKGROUND ART

In general, an automatic transmission of a vehicle includes a plurality of hydraulic clutches, and selectively performs engagement or opening of the hydraulic clutches to perform shifting. The hydraulic clutch is connected to a hydraulic pump via an electromagnetic proportional valve, and it is configured such that by allowing a current to flow to the electromagnetic proportional valve, operating oil is supplied to the hydraulic clutch. The cylinder of the hydraulic clutch is filled with the operating oil, and thus, the hydraulic clutch is engaged and power is transmitted from the engine to wheels.

At this time, when the oil pressure of the operating oil supplied from the hydraulic pump to the hydraulic clutch (hereinafter, referred to as an "output oil pressure") is not appropriate, a shifting shock occurs or a shifting delay occurs. Given such a background, various hydraulic control apparatuses or hydraulic control methods each of which increases the control accuracy of the output oil pressure have been proposed in the related art.

CITATION LIST

Patent Literature

PTL 1
Japanese Patent Application Laid-Open No. 2011-256987

SUMMARY OF INVENTION

Technical Problem

Incidentally, in an automatic transmission mounted in a vehicle, parts constituting a hydraulic clutch, an electromagnetic proportional valve, and the like generally have individual differences for each vehicle, such as dimensional variations during manufacturing. For this reason, in such an automatic transmission, there may be individual differences for each vehicle with respect to the oil pressure when causing a hydraulic clutch to be engaged or with respect to a filling completion time at which filling of the operating oil is completed.

Such individual differences cause variations in a time lag from a shifting operation to engagement of a hydraulic clutch in an automatic transmission. Such individual differences also cause a shifting delay. In addition, depending on the state of a hydraulic clutch, an electromagnetic proportional valve, or the like, there is also a concern that a torque shock may occur during shifting.

As described above, at the automatic transmission according to the related art, a shifting delay may occur, or feelings during shifting may vary between vehicles.

In addition, the states of the parts such as a hydraulic clutch and an electromagnetic proportional valve usually deteriorate over time. For this reason, for the automatic transmission according to the related art, there is also a concern that a shifting delay may occur during use, or the feeling during shifting may change over time.

The present invention has been made in consideration of the above-described problems, and an object of the present invention is to provide a hydraulic control apparatus of an automatic transmission, and a vehicle, each of which allows appropriate adjustment of feelings during shifting.

Solution to Problem

A main aspect of the present disclosure for solving the above-described problems is a hydraulic control apparatus of an automatic transmission that performs shifting of a vehicle by engaging and opening a hydraulic clutch. The hydraulic control apparatus includes:

an electromagnetic proportional valve that is disposed in a hydraulic circuit and performs pressure regulation of operating oil supplied to the hydraulic clutch;

a pressure sensor that detects an oil pressure of the operating oil supplied to the hydraulic clutch; and a control apparatus that executes filling of the hydraulic clutch with the operating oil and causes the hydraulic clutch to transition from an opened state to an engaged state by outputting, according to a control map stored in advance, a pulsed control current having a predetermined current value and a predetermined application time to the electromagnetic proportional valve.

The control apparatus performs correction processing of correcting the predetermined current value and the predetermined application time, which are stored in the control map, at a predetermined timing such that the oil pressure of the operating oil supplied to the hydraulic clutch is within a predetermined target pressure range when the control apparatus outputs the pulsed control current to the electromagnetic proportional valve.

Another aspect is a vehicle including the hydraulic control apparatus described above.

Advantageous Effects of Invention

The hydraulic control apparatus according to the present invention allows appropriate adjustment of feelings during shifting.

DESCRIPTION OF EMBODIMENTS

Hereinafter, a preferred embodiment of the present invention will be described in detail with reference to the accompanying drawings. Note that, in the present specification and drawings, components having substantially the same functions are denoted by the same reference signs, and redundant descriptions are omitted thereby.

Hydraulic Control Apparatus of Automatic Transmission

Hereinafter, an example of a configuration of a hydraulic control apparatus (hereinafter referred to as "hydraulic control apparatus 1") of an automatic transmission according to an embodiment of the present invention will be described.

Note that, the automatic transmission according to the present embodiment is, for example, a multi-speed automatic transmission (not illustrated), and has the same configuration as the conventional configuration known in the related art in which power is transmitted using a plurality of gears and the gear ratio is changed in steps. The automatic transmission is provided with a clutch as a friction element that operates according to an output oil pressure of operating oil supplied from the hydraulic control apparatus.

Figure 1:
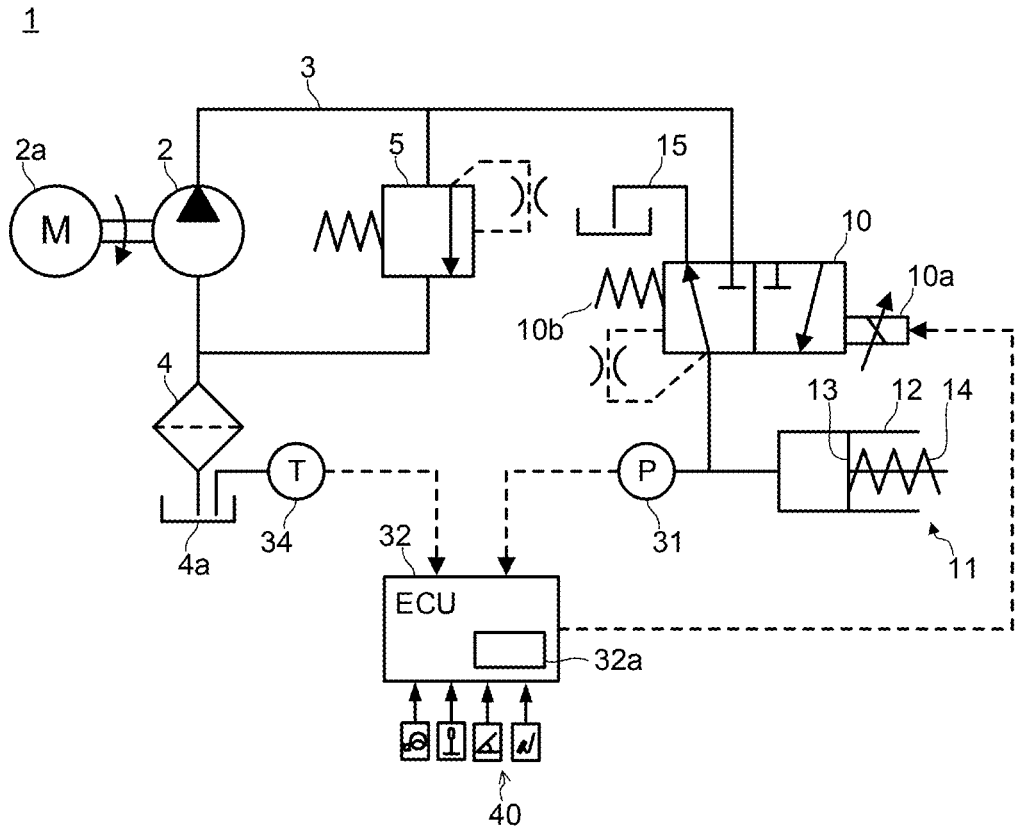
FIG. 1 is a diagram illustrating an example of a configuration of a hydraulic control apparatus of an automatic transmission.

FIG. 1 is a diagram illustrating an example of a configuration of hydraulic control apparatus 1 of the automatic transmission.

Hydraulic control apparatus 1 adjusts the output oil pressure of the operating oil supplied to hydraulic clutch 11 of the automatic transmission to change between an engaged state and an opened state of hydraulic clutch 11, and causes the automatic transmission to perform shifting.

Hydraulic control apparatus 1 includes hydraulic pump 2, pump driving motor 2a, pipe line 3 that constitutes a hydraulic circuit, filter 4, first drain 4a, relief valve 5, electromagnetic proportional valve 10, second drain 15, oil temperature sensor 34, pressure sensor 31, and ECU 32.

Pipe line 3 includes one end, which is connected to first drain 4a that stores the operating oil, and the other end, which is connected to hydraulic clutch 11 that is a supply destination of the operating oil, and constitutes a flow passage of the operating oil. Hydraulic pump 2, filter 4, and electromagnetic proportional valve 10 are connected between first drain 4a and hydraulic clutch 11 in pipe line 3. Further, relief valve 5 is provided in parallel with filter 4 in pipe line 3.

Hydraulic pump 2 operates by utilizing the power of pump driving motor 2a, pumps up the operating oil from first drain 4a, and ejects the operating oil, of which the pressure has been regulated to a high pressure, into pipe line 3.

Hydraulic clutch 11 is configured to be capable of transmitting, by being engaged, the power of the engine, which is mounted in the vehicle, to the wheels. Here, as hydraulic clutch 11, a wet multi-plate hydraulic clutch is used.

Hydraulic clutch 11 includes piston chamber 12, clutch piston 13, and return spring 14. Clutch piston 13 is slidably housed, within piston chamber 12, in a state of being biased by return spring 14.

The configuration itself of hydraulic clutch 11 is the same as the configuration known in the art. It is configured such that the operating oil from hydraulic control apparatus 1 (hydraulic pump 2) is supplied into piston chamber 12, and that this operating oil causes clutch piston 13 to be pushed against the biasing force of return spring 14. Then, the operating oil is filled into piston chamber 12, and thus, a plurality of clutch plates (not illustrated) provided in hydraulic clutch 11 is pushed by clutch piston 13 to abut on each other and hydraulic clutch 11 is engaged. When hydraulic clutch 11 is engaged, a state in which the power of the engine of the vehicle is transmitted to the wheels is reached.

That is, hydraulic clutch 11 is switched from the opened state to the engaged state by clutch piston 13 operating with the operating oil introduced from hydraulic control apparatus 1 to piston chamber 12. The state of hydraulic clutch 11 mainly depends on the output oil pressure from hydraulic control apparatus 1 and, for example, hydraulic clutch 11 is in the engaged state when the output oil pressure from hydraulic control apparatus 1 is equal to or greater than a predetermined threshold, whereas hydraulic clutch 11 is in the opened state when the output oil pressure is less than the predetermined threshold.

Note that, hydraulic control apparatus 1 may be provided with a plurality of hydraulic clutches in parallel with hydraulic clutch 11. Then, the gear ratio of the automatic transmission may be changeable by changing a combination of engagement or opening of each of the plurality of hydraulic clutches.

Electromagnetic proportional valve 10 is disposed between hydraulic pump 2 and hydraulic clutch 11 in the hydraulic circuit, and performs pressure regulation of the output oil pressure of the operating oil supplied to hydraulic clutch 11. Electromagnetic proportional valve 10 is driven by, for example, solenoid 10a, and supplies the operating oil having an output oil pressure according to the operation of solenoid 10a to hydraulic clutch 11. Since the configuration of electromagnetic proportional valve 10 is the same as the conventional configuration known in the related art, a detailed description thereof will be omitted here (see, for example, PTL 1).

Electromagnetic proportional valve 10 is configured such that a spool valve inside electromagnetic proportional valve 10, where the spool valve is disposed integrally with solenoid 10a, moves by the driving of solenoid 10a and the oil amount of the operating oil to be supplied to hydraulic clutch 11 is adjusted according to the position of the spool valve. Specifically, when a control current is supplied to solenoid 10a, solenoid 10a is driven, the spool valve inside electromagnetic proportional valve 10 moves to one side, and the oil amount of the operating oil supplied from hydraulic pump 2 to the hydraulic clutch 11 increases, and thus, the output oil pressure of the operating oil supplied to hydraulic clutch 11 increases. On the other hand, in a state in which the control current is not supplied to solenoid 10a, solenoid 10a is not driven, the spool valve inside electromagnetic proportional valve 10 moves to the other side by the biasing force of return spring 10b provided on a side opposite to solenoid 10a, the oil amount of the operating oil supplied from hydraulic pump 2 to hydraulic clutch 11 decreases, and thus, the output oil pressure of the operating oil supplied to hydraulic clutch 11 decreases.

Note that, in a case where the control current does not flow to solenoid 10a, electromagnetic proportional valve 10 is configured to connect hydraulic clutch 11 and second drain 15 with each other, and to discharge the operating oil within piston chamber 12 to second drain 15.

Electromagnetic proportional valve 10 (solenoid 10a) is electrically connected to ECU 32, and is operated and controlled by the control current supplied from ECU 32. Basically, solenoid 10a generates a driving force corresponding to the current value of the supplied control current and moves the spool valve inside electromagnetic proportional valve 10 by the amount corresponding to the current value of the control current. That is, electromagnetic proportional valve 10 adjusts the oil amount of the operating oil supplied from hydraulic pump 2 to hydraulic clutch 11 such that the output oil pressure corresponds to the current value of the supplied control current.

Pressure sensor 31 is provided in pipe line 3 between electromagnetic proportional valve 10 and hydraulic clutch 11. Pressure sensor 31 is configured to be capable of detecting the pressure within piston chamber 12 of hydraulic clutch 11, that is, the output oil pressure of the operating oil supplied from hydraulic pump 2 to hydraulic clutch 11. This pressure sensor 31 is electrically connected to ECU 32 and is configured to transmit the detected output oil pressure to ECU 32.

Oil temperature sensor 34 is disposed within first drain 4a and detects the temperature of the operating oil (that is, the oil temperature). This oil temperature sensor 34 is electrically connected to ECU 32 and is configured to transmit the detected oil temperature to ECU 32.

ECU 32 (corresponding to the control apparatus in the present invention) is formed of, for example, a microcomputer, a driving circuit, and the like, and executes shifting control processing by controlling the operation of hydraulic clutch 11. Specifically, ECU 32 is electrically connected to solenoid 10a of electromagnetic proportional valve 10 and controls the operation of electromagnetic proportional valve 10 by controlling a current flowing to solenoid 10a. ECU 32 then performs pressure regulation of the output oil pressure (that is, adjusts the output oil amount) of the operating oil supplied to hydraulic clutch 11 by controlling the operation of electromagnetic proportional valve 10, thereby controlling the operation of hydraulic clutch 11.

ECU 32 supplies, based on control map 32a, a control current having a predetermined waveform (to be described later with reference to FIG. 2A) to electromagnetic proportional valve 10 to control the operation of electromagnetic proportional valve 10. Data of control map 32a is stored in advance in, for example, a storage section (for example, ROM) included in ECU 32.

Note that, ECU 32 is configured to be capable of acquiring a detection signal of pressure sensor 31 and a detection signal of oil temperature sensor 34 in order to acquire state information on the operating oil. In addition, ECU 32 is configured to be capable of acquiring detection signals of various sensors (for example, a shift lever sensor, a throttle opening degree sensor, an engine rotation speed sensor, a vehicle speed sensor, and an acceleration sensor) 40 or the like provided in the vehicle in order to acquire various driving information on the vehicle required for executing the shifting control processing.

Regarding Engagement Operations of Hydraulic Clutch 11

Hereinafter, operations of hydraulic control apparatus 1 (ECU 32 and electromagnetic proportional valve 10) when hydraulic clutch 11 is changed from the opened state to the engaged state will be described with reference to FIGS. 2A and 2B.

Figure 2A:
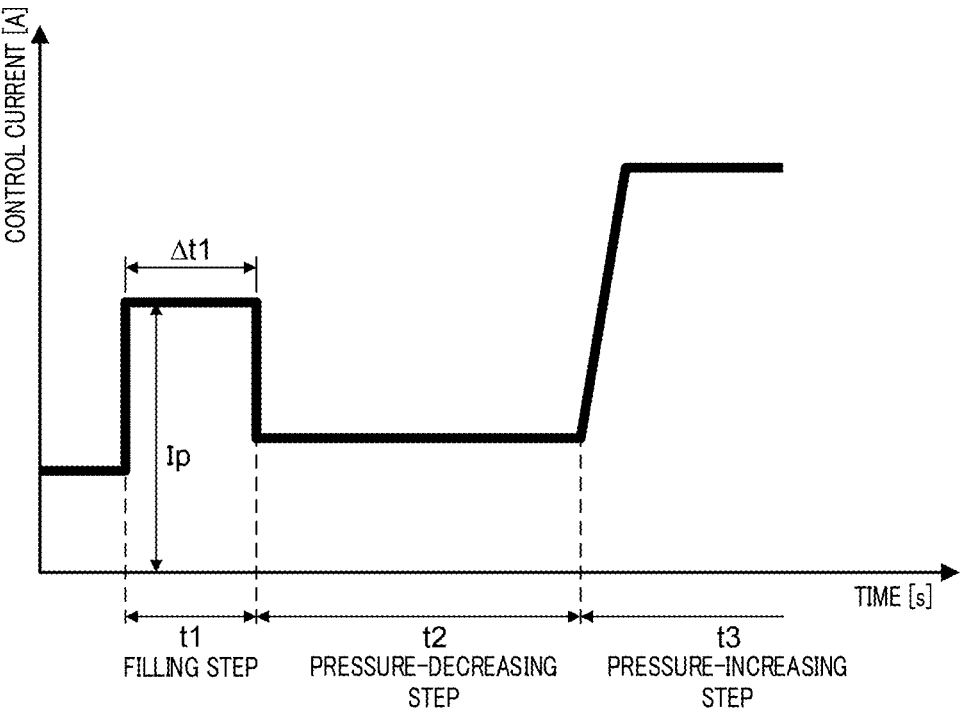
FIGS. 2A and 2B are diagrams provided for describing operations of the hydraulic control apparatus when a hydraulic clutch is changed from an opened state to an engaged state.

FIG. 2A is a diagram illustrating an example of an aspect of the control current output from ECU 32 to electromagnetic proportional valve 10 when hydraulic clutch 11 is engaged. In FIG. 2A, the horizontal axis represents a time axis, and the vertical axis represents current value [A] of the control current output to electromagnetic proportional valve 10.

Figure 2B:
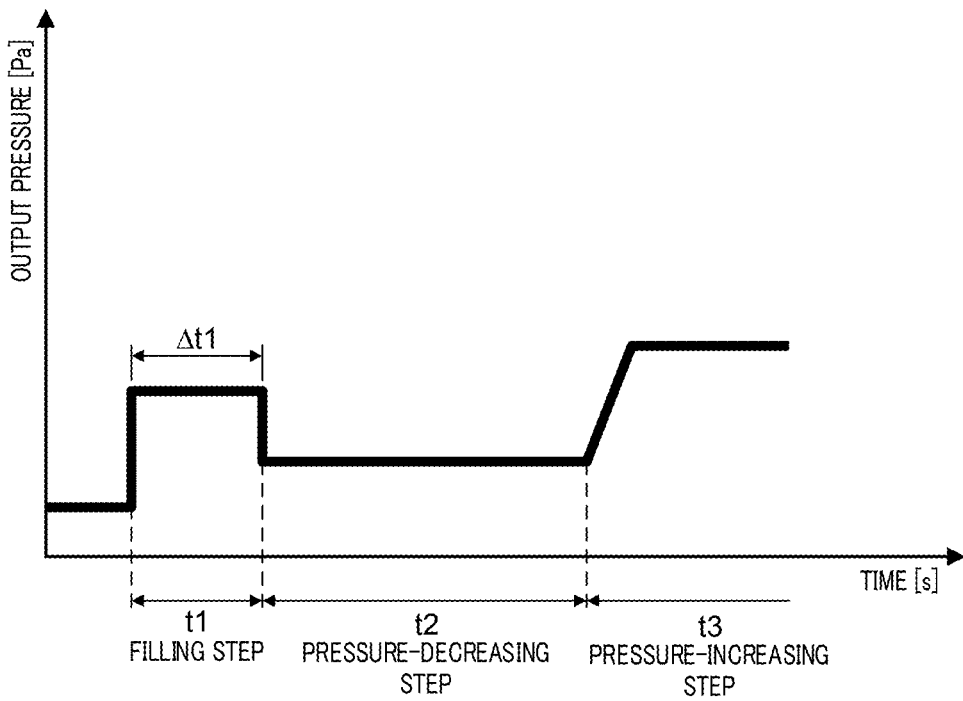

FIG. 2B is a diagram illustrating an example of a behavior of the output oil pressure of the operating oil supplied to hydraulic clutch 11, which corresponds to the operations of electromagnetic proportional valve 10 in FIG. 2A. In FIG. 2B, the horizontal axis represents a time axis, and the vertical axis represents output oil pressure [Pa] of the operating oil supplied to hydraulic clutch 11. Note that, FIGS. 2A and 2B are drawn with the time axes aligned.

The vehicle is provided with, for example, a shift lever for switching the shifting stage of the automatic transmission. When the driver operates the shift lever, ECU 32 causes the control current to flow to electromagnetic proportional valve 10 in response to the operation, and an engagement operation of hydraulic clutch 11 is executed.

The operations of hydraulic control apparatus 1 for causing hydraulic clutch 11 to be engaged consist of filling step t1, pressure-decreasing step t2, and pressure-increasing step t3. That is, the engagement operation of hydraulic clutch 11 is started from filling step t1. Note that, the reason why the control current is supplied from a stage before filling step t1 in FIG. 2A is to maintain the output oil pressure of the operating oil supplied to hydraulic clutch 11 at a certain level even in a state where hydraulic clutch 11 is opened and to shorten the rise time when hydraulic clutch 11 is changed from the opened state to the engaged state.

Filling step t1 is a step of filling hydraulic clutch 11 with the operating oil. That is, when the shift lever is operated, ECU 32 first causes the control current to flow to electromagnetic proportional valve 10 according to control map 32a in order to fill hydraulic clutch 11 with the operating oil. In filling step t1, ECU 32 supplies a pulsed control current to electromagnetic proportional valve 10.

Here, the pulsed control current is set to relatively high current value Ip in order to shorten the filling completion time until the filling of the operating oil is completed. In addition, application time (that is, pulse width) $\Delta t1$ of the pulsed control current is set to an appropriate time width (for example, 0 point something seconds) such that the filling of hydraulic clutch 11 (that is, piston chamber 12) with the operating oil is completed by using the above pulsed control current.

Filling step t1 causes a large amount of the operating oil to be supplied from electromagnetic proportional valve 10 to hydraulic clutch 11. The output oil pressure during this time increases at the same time as electromagnetic proportional valve 10 is opened, and then becomes a constant pressure determined according to the biasing force of return spring 14 of hydraulic clutch 11. When the filling of the operating oil is completed, a state in which hydraulic clutch 11 is engaged and the power of the engine of the vehicle is transmitted to the wheels is reached. However, in such a state immediately after the filling completion, a pressing force for causing the plurality of clutch plates to abut on each other within hydraulic clutch 11 is small, and thus, the plurality of clutch plates slides on each other (that is, a half-clutch state).

Pressure-decreasing step t2 is a step of decreasing the output oil pressure of the operating oil flowing from electromagnetic proportional valve 10 to hydraulic clutch 11 by significantly decreasing the current value of the control current, which is caused by ECU 32 to flow to electromagnetic proportional valve 10, such that the current value becomes significantly smaller than the current value in filling step t1. In pressure-decreasing step t2, the current value of the control current is set to be significantly smaller than the current value in filling step t1 such that the output oil pressure of the operating oil becomes a predetermined pressure determined in advance.

As described above, the output oil pressure of the operating oil flowing to hydraulic clutch 11 is temporarily decreased, thereby suppressing a shock of hydraulic clutch 11, which occurs when hydraulic clutch 11 is engaged. In pressure-decreasing step t2, the output oil pressure of the operating oil is maintained at a substantially constant pressure. Note that, the time width in pressure-decreasing step t2 may be a little time (for example, 0 point something seconds to several seconds) after the output oil pressure of the operating oil flowing to hydraulic clutch 11 decreases from the oil pressure in filling step t1 to the predetermined pressure determined in advance.

Pressure-increasing step t3 is a step of increasing the output oil pressure of the operating oil flowing from electromagnetic proportional valve 10 to hydraulic clutch 11 by significantly increasing the current value of the control current, which is caused by ECU 32 to flow to electromagnetic proportional valve 10, such that the current value becomes significantly larger than the current value in pressure-decreasing step t2. In pressure-increasing step t3, ECU 32 increases the output pressure of the operating oil supplied from electromagnetic proportional valve 10 to hydraulic clutch 11 by gradually increasing the current value of the control current flowing to electromagnetic proportional valve 10 such that the current value becomes gradually larger than the current value in pressure-decreasing step t2. In this pressure-increasing step t3, the current value of the control current flowing to electromagnetic proportional valve 10 is controlled to be finally larger than the current value of the pulsed control current in filling step t1.

By this pressure-increasing step t3, the pressing force is increased to cause hydraulic clutch 11 to be completely engaged. Thereby, a state in which the power of the engine of the vehicle is completely transmitted to the wheels is reached, and the shifting is completed.

Note that, although the above description has been made by ignoring the influence of the oil temperature of the operating oil when hydraulic clutch 11 is operated, the viscosity resistance or the like of the operating oil in practice changes depending on the oil temperature of the operating oil, and the operation aspect of hydraulic clutch 11 changes slightly. For this reason, it is preferable for ECU 32 to store, with in a memory in advance, control map 32a for each oil temperature of the operating oil, and to determine, based on the oil temperature of the operating oil detected by oil temperature sensor 34, control map 32a to be read out (see FIGS. 5A and 5B).

Regarding Correction Function of Control Map in ECU 32

Hydraulic clutch 11 is engaged as described above, but in order to improve the shifting feeling while shortening the time until the shifting completion at the automatic transmission, it is important to adjust the output oil pressure when filling hydraulic clutch 11 with the operating oil to bring hydraulic clutch 11 into the half-clutch state, that is, the output oil pressure of the operating oil in filling step t1.

However, as described above, the parts constituting hydraulic clutch 11, electromagnetic proportional valve 10, and the like generally have individual differences for each vehicle, such as dimensional variations during manufacturing, and may have individual differences for each vehicle in the output oil pressure when electromagnetic proportional valve 10 is operated. In addition, due to deterioration over time of hydraulic clutch 11, electromagnetic proportional valve 10, and the like, the operation aspect of electromagnetic proportional valve 10 also changes slightly when the same control current is supplied.

Accordingly, ECU 32 according to the present embodiment corrects the current value and the application time of the pulsed control current, which are stored in control map 32a, such that the aspect of filling hydraulic clutch 11 with the operating oil in filling step t1 becomes appropriate.

Examples of a timing at which ECU 32 executes such correction include a case where a control map correction instruction is made by the driver, and a case where a change in the shifting feeling is detected from the detection signals of the various sensors provided in the vehicle (see the variation to be described later).

Note that, as a method for ECU 32 to adjust the output oil pressure of the operating oil, a method for ECU 32 to perform feedback control of the control current of electromagnetic proportional valve 10 based on the pressure detected by pressure sensor 31 during shifting of the automatic transmission is also conceivable. However, there is a response delay between when the control current applied to electromagnetic proportional valve 10 is changed and when electromagnetic proportional valve 10 actually operates and the output oil pressure of the operating oil supplied to hydraulic clutch 11 changes. In addition, filling step t1 is a step of applying the pulsed control current for an extremely short time. For this reason, it is practically difficult for ECU 32 to perform feedback control of the control current of electromagnetic proportional valve 10 based on, in addition to taking into account such a response delay, the pressure detected by pressure sensor 31 during shifting of the automatic transmission, such that the shifting feeling becomes appropriate.

From such a viewpoint, ECU 32 according to the present embodiment observes the behavior of the output oil pressure of the operating oil corresponding to the control current of electromagnetic proportional valve 10 and corrects control map 32a with the correction function.

Figure 3:
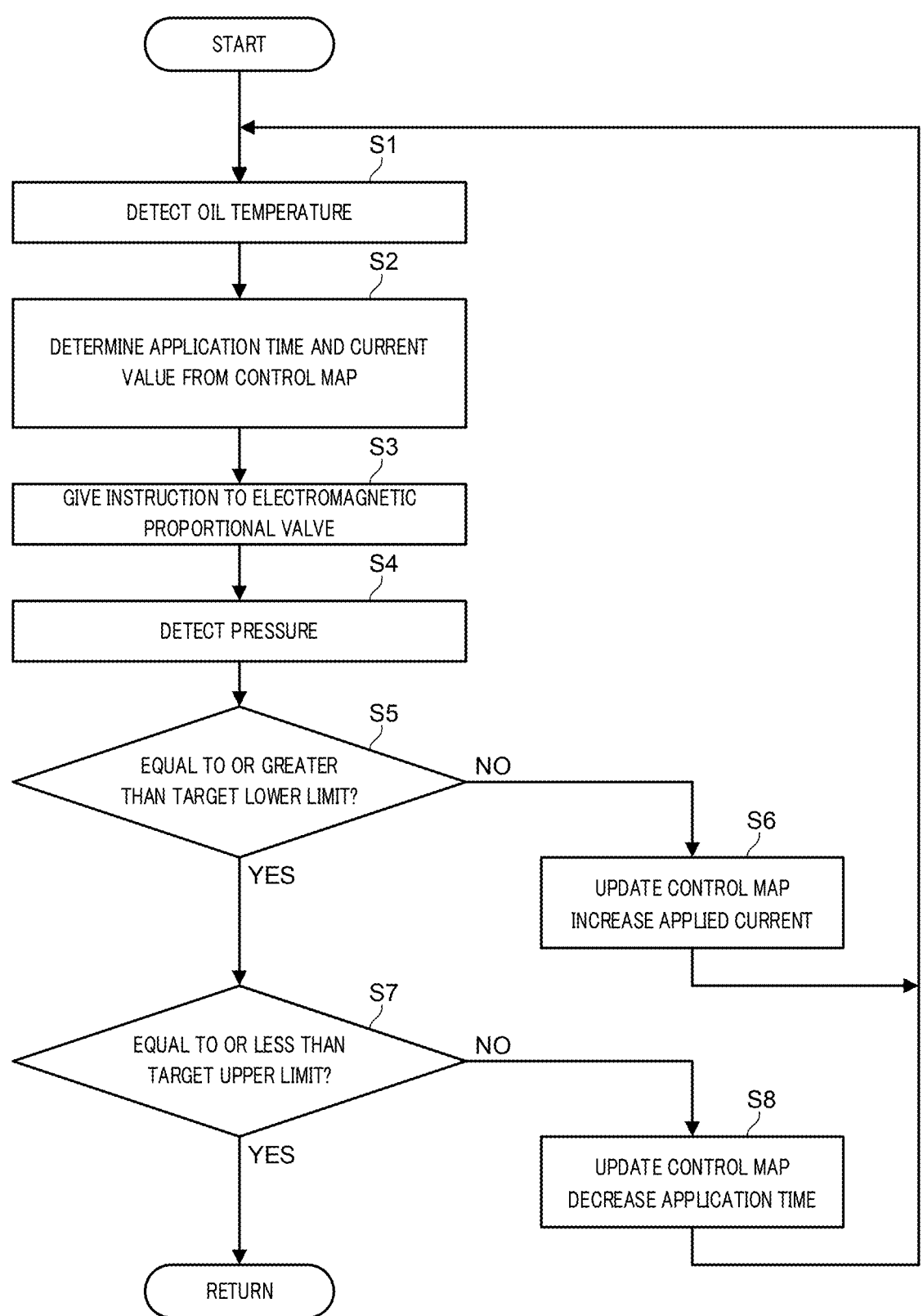
FIG. 3 is a diagram illustrating an example of an operation flow of control map correction processing by an ECU.

FIG. 3 is a diagram illustrating an example of an operation flow of control map correction processing by ECU 32 according to the present embodiment. Note that, the processing of the flowchart illustrated in FIG. 3 is, for example, processing executed by ECU 32 according to a computer program. ECU 32 starts the processing of the flowchart of FIG. 3, for example, as an opportunity to receive a control map correction instruction from the driver.

FIGS. 4A, 4B, 5A, 5B, 6A, and 6B are diagrams illustrating change aspects of the pulsed control current before and after each correction processing at the time of the control map correction processing and examples of the behavior of the output oil pressure of the operating oil according to the present embodiment.

Figures 4A, 4B:
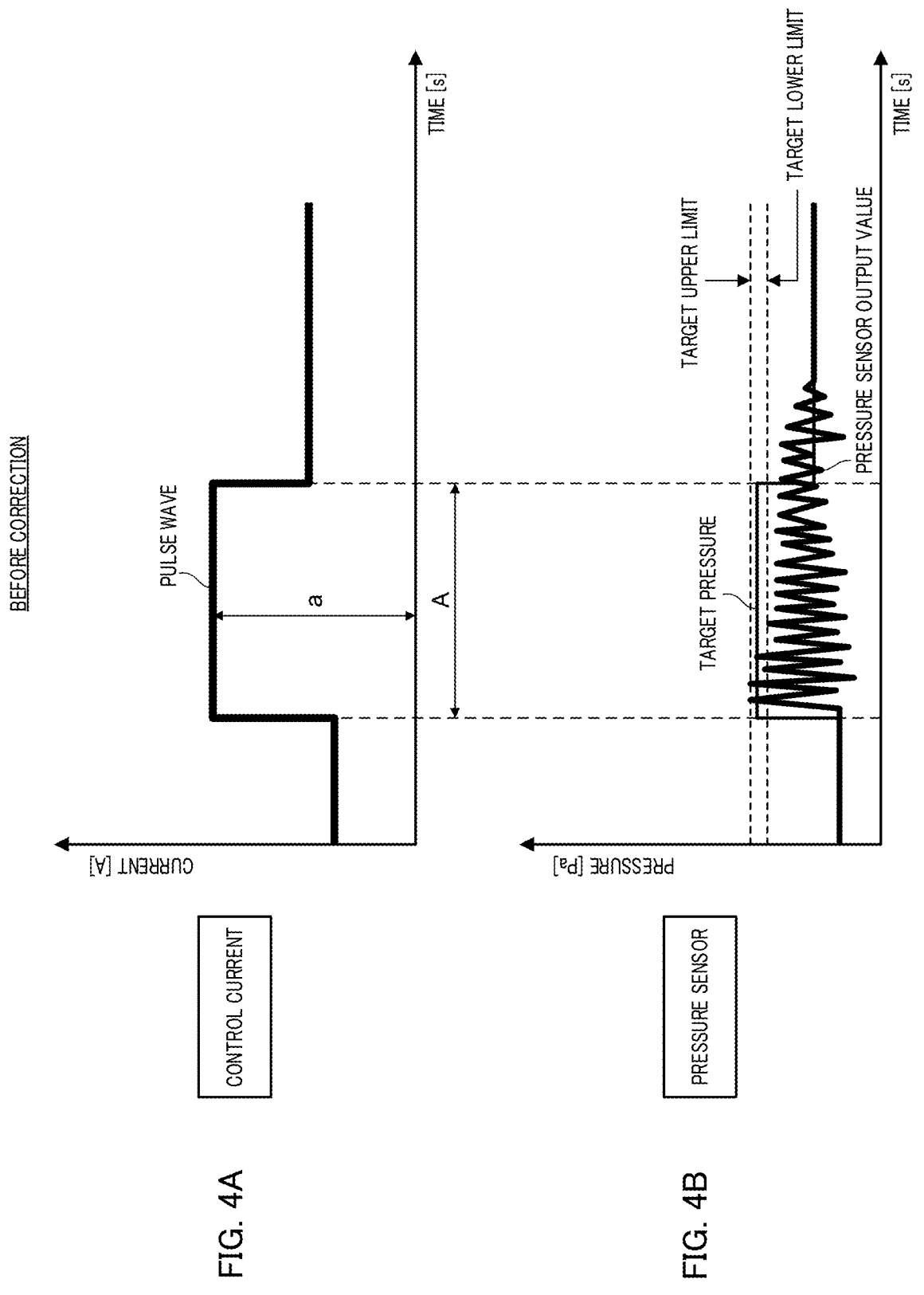
FIGS. 4A and 4B are diagrams illustrating a change aspect of a pulsed control current before correction and an example of a behavior of an output oil pressure of operating oil.
Figures 5A, 5B:
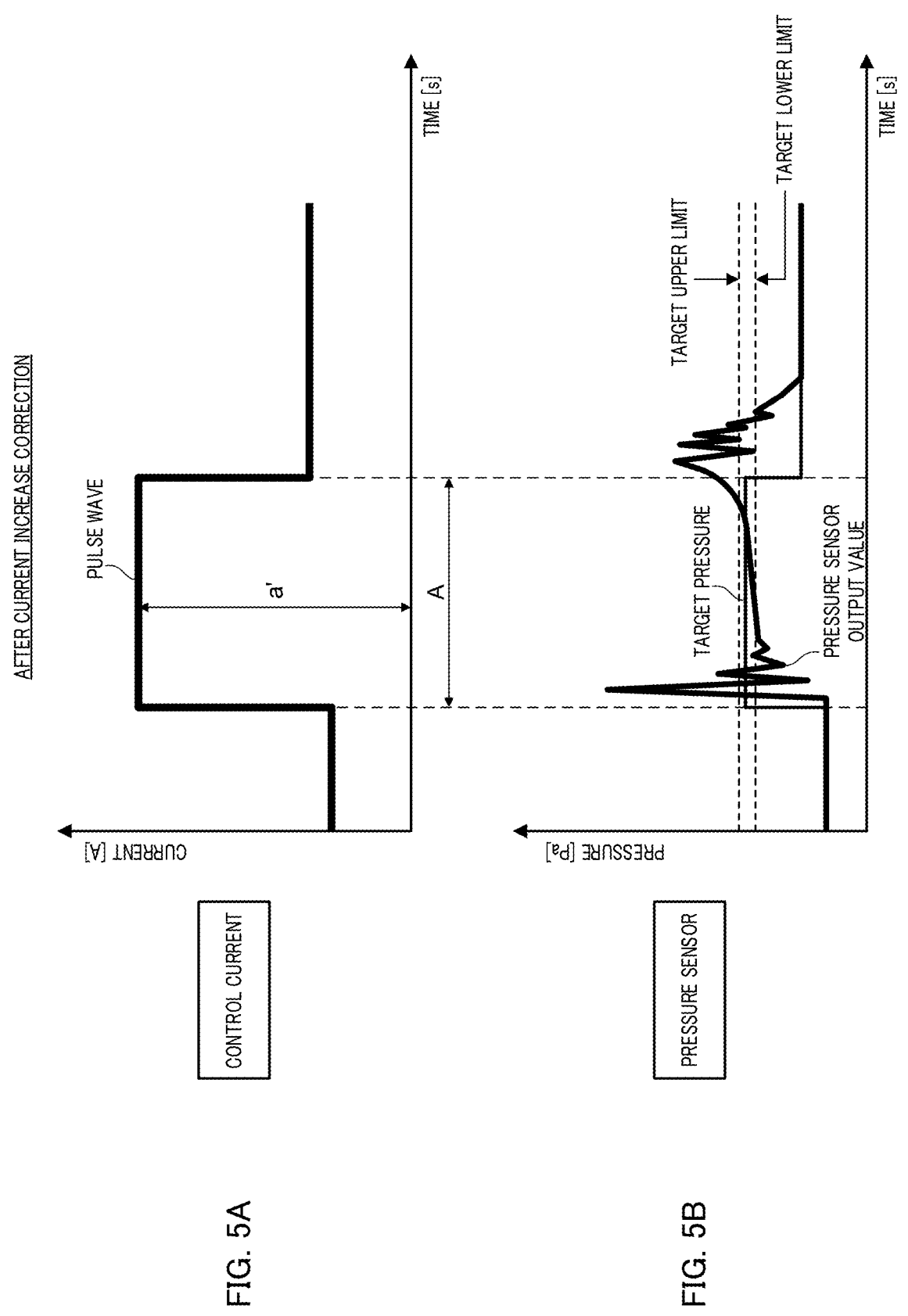
FIGS. 5A and 5B are diagrams illustrating a change aspect of the pulsed control current and an example of the behavior of the output oil pressure of the operating oil after current value correction of the control current.
Figures 6A, 6B:
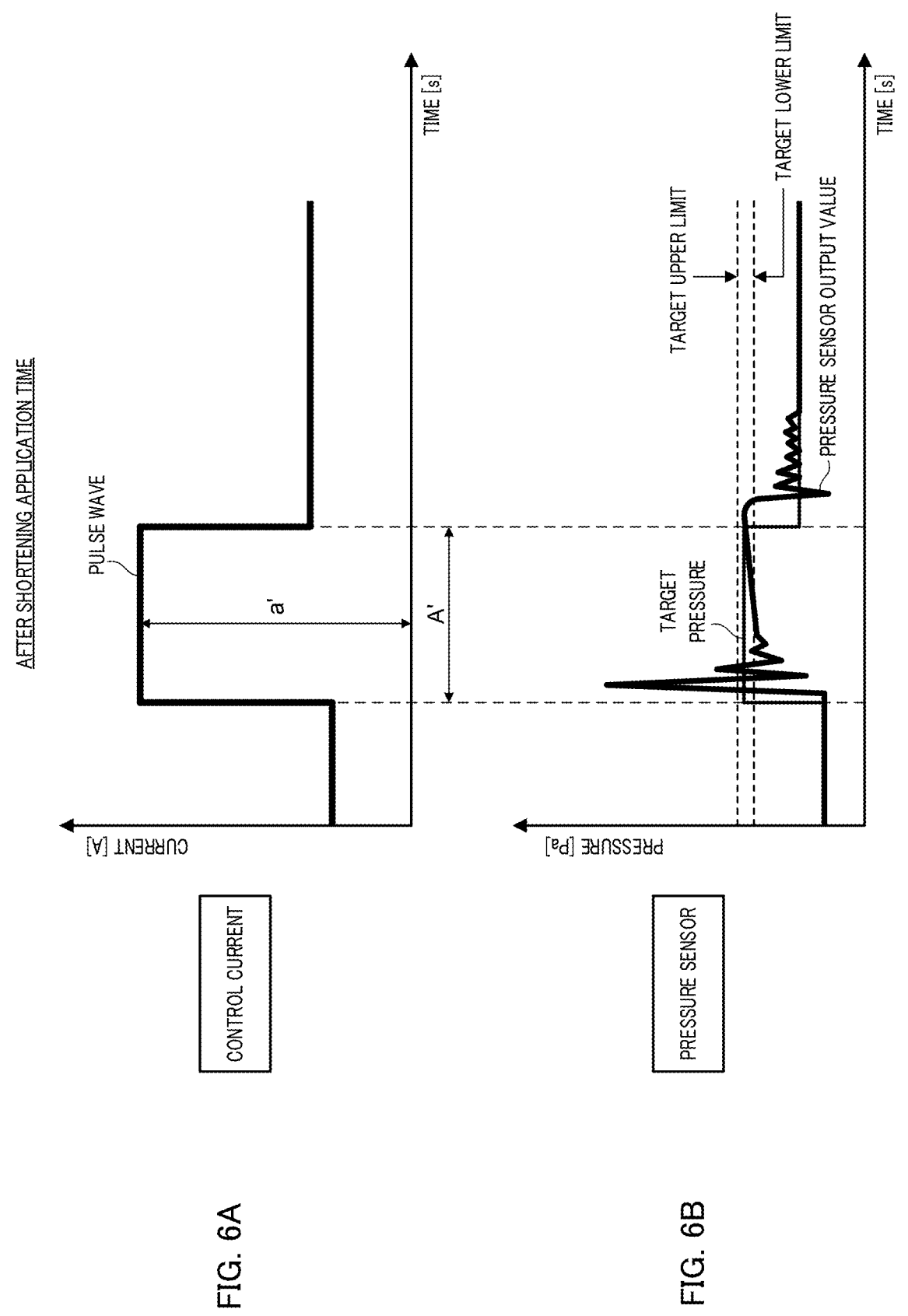
FIGS. 6A and 6B are diagrams illustrating a change aspect of the pulsed control current and an example of the behavior of the output oil pressure of the operating oil after application time correction of the control current.

FIGS. 4A and 4B are diagrams illustrating an aspect of the pulsed control current (FIG. 4A) and an example of the behavior of the output oil pressure of the operating oil (FIG. 4B) before the control map correction processing. FIGS. 5A and 5B are diagrams illustrating an aspect of the pulsed control current (FIG. 5A) and an example of the behavior of the output oil pressure of the operating oil (FIG. 5B) after the applied current is increased from that in the aspect in FIGS. 4A and 4B (that is, S6). FIGS. 6A and 6B are diagrams illustrating an aspect of the pulsed control current (FIG. 6A) and an example of the behavior of the output oil pressure of the operating oil (FIG. 6B) after the application time is increased from that in the aspect in FIGS. 5A and 5B (that is, S8).

Figure 7:
FIG. 7 is a diagram illustrating an example of data according to an applied current and the application time of the pulsed control current that are stored in the control map.

FIG. 7 is a diagram illustrating an example of data according to the applied current and the application time of the pulsed control current that are stored in control map 32a (the applied current and the application time in filling step t1).

Here, the processing of the flowchart in FIG. 3 will be described in order. Note that, in the processing of the flowchart in FIG. 3, the main focus is on making the application time of the pulsed control current as short as possible from the viewpoint of shortening the time until the shifting completion at the automatic transmission. For this reason, the processing of the flowchart in FIG. 3 is a procedure for making the application time as short as possible while adjusting the applied current of the pulsed control current to an appropriate value.

In step S1, ECU 32 acquires a detection signal from oil temperature sensor 34 and detects the oil temperature of the operating oil.

In step S2, ECU 32 determines the application time and the current value of the pulsed control current based on control map 32a.

In step S3, ECU 32 outputs the pulsed control current having the application time and the current value, which have been determined in step S2, to electromagnetic proportional valve 10.

In step S4, ECU 32 acquires a detection signal from pressure sensor 31 and detects the output oil pressure of the operating oil.

In order to improve the shifting feeling while shortening the time until the shifting completion at the automatic transmission, the output oil pressure when filling hydraulic clutch 11 with the operating oil to bring hydraulic clutch 11 into the half-clutch state, that is, the output oil pressure of the operating oil when completing filling step t1 becomes important. In addition, normally, there is a response delay from when the pulsed control current is output to when electromagnetic proportional valve 10 operates and the oil amount of the operating oil supplied to hydraulic clutch 11 follows the pulse output.

From such a viewpoint, in following steps S5 and S7, when determining the magnitude of the output oil pressure of the operating oil, ECU 32 uses the output oil pressure, which has been detected by pressure sensor 31, as a reference at a timing after a predetermined time has elapsed from a rise timing of the pulsed control current, for example, at a fall timing.

In step S5, ECU 32 determines whether the output oil pressure of the operating oil is equal to or greater than a lower limit value of the target pressure range. In a case where the output oil pressure of the operating oil is equal to or greater than the lower limit value of the target pressure range (S5: YES), the processing proceeds to step S7, and in a case where the output oil pressure of the operating oil is not equal to or greater than the lower limit value of the target pressure range (S5: NO), the processing proceeds to step S6.

Note that, here, the target pressure range is a predetermined pressure range set using a pressure against the biasing force of return spring 14 of hydraulic clutch 11 as a reference. In FIGS. 4B, 5B, and 6B, the pressure against the biasing force of return spring 14 is described as the target pressure.

In step S6, ECU 32 increases the current value of the pulsed control current stored on control map 32a by a predetermined amount. Here, it is because, in a case where the output oil pressure of the operating oil is not equal to or greater than the lower limit value of the target pressure range (S5: NO), the output oil pressure of the operating oil is in a state in which the force against the biasing force of return spring 14 of hydraulic clutch 11 is small and the filling of the operating oil into clutch 11 is not smoothly performed (see FIGS. 4A and 4B).

In FIGS. 4A and 4B, the reason why the output oil pressure of the operating oil indicates a behavior of fluctuating up and down is that the output oil pressure of the operating oil is low compared to the biasing force of return spring 14 of hydraulic clutch 11, and that piston chamber 12 of hydraulic clutch 11 performs a behavior in which expansion and contraction are repeated. For this reason, in this case, on actual hydraulic clutch 11, a state in which the filling of hydraulic clutch 11 with the operating oil is not completed remains even after filling step t1 on control map 32a is completed (that is, the half-clutch state is not completed). In such a state, when pressure-increasing step t3 is performed after pressure-decreasing step t2 on control map 32a, on actual hydraulic clutch 11, engagement is performed in a forced manner from a state in which the half-clutch state is not completed, and thus, a large shifting shock occurs. In addition, at this time, it takes a longer time than usual until the engagement of hydraulic clutch 11 is completed.

In this step S6, the current value of the pulsed control current stored on control map 32a is increased by the predetermined amount, and thus, the port width of the port connecting hydraulic pump 2 and hydraulic clutch 11 in electromagnetic proportional valve 10 widens. Accordingly, the oil amount of the high-pressure operating oil fed out from pump 2 to hydraulic clutch 11 increases, and the output oil pressure of the operating oil increases. In this state, since the filling of the operating oil into hydraulic clutch 11 is smoothly performed against the biasing force of return spring 14 of hydraulic clutch 11, the output oil pressure of the operating oil detected by pressure sensor 31 indicates a substantially constant value during filling step t1.

However, when the current value of the pulsed control current is increased to some extent in order to make the application time of the pulsed control current as short as possible, the application time of the pulsed control current is slightly lengthened. For this reason, the output oil pressure of the operating oil increases after the filling of hydraulic clutch 11 with the operating oil is completed. It is why in FIGS. 5A and 5B that the output oil pressure of the operating oil detected by pressure sensor 31 rapidly increases after filling step t1 on control map 32a is completed.

After this step S6, ECU 32 returns to step S1 and executes the update processing again in order to confirm that the output oil pressure of the operating oil is within the target pressure range.

Note that, the lower limit value of the target pressure range is set to an appropriate value by using the biasing force of return spring 14 as a reference. For this reason, ECU 32 repeatedly executes steps S1 to S6 as necessary to adjust the applied current of the pulsed control current on control map 32a to an appropriate value.

In step S7, ECU 32 determines whether the output oil pressure of the operating oil is equal to or less than an upper limit value of the target pressure range. In a case where the output oil pressure of the operating oil is equal to or less than the upper limit value of the target pressure range (S7: YES), the processing of the flowchart in FIGS. 4A and 4B ends without particularly performing any processing. In a case where the output oil pressure of the operating oil is not equal to or less than the upper limit value of the target pressure range (S7: NO), the processing proceeds to S8.

In step S8, ECU 32 decreases the application time of the pulsed control current stored on control map 32a by a predetermined width.

As described above, in a case where the output oil pressure of the operating oil is equal to or greater than the upper limit value of the target pressure range, it is supposed that, as illustrated in FIGS. 5A and 5B, the application time of the pulsed control current stored on control map 32a is too long, and that a state in which the oil amount of the high-pressure operating oil to be fed out to hydraulic clutch 11 is increased continues even after the filling of the operating oil into clutch 11 is completed. In this state, on actual hydraulic clutch 11, the half-clutch state transitions in a forced manner to a clutch-engaged state in filling step t1 which is a preparation stage (that is, the clutch-engaged state is reached without going through pressure-decreasing step t2), and thus, a large shifting shock occurs.

In this step S8, the application time of the pulsed control current stored on control map 32a is decreased by the predetermined width, and thus, the port width expansion time of the port connecting pump 2 and hydraulic clutch 11 in electromagnetic proportional valve 10 is matched to a filling completion timing of filling the operating oil into hydraulic clutch 11. That is, as a result, as illustrated in FIGS. 6A and 6B, the state in which the output oil pressure of the operating oil rapidly increases after the filling completion of filling hydraulic clutch 11 with the operating oil is resolved, and thus, the output oil pressure of the operating oil can be suppressed within the target pressure range.

After this step S8, ECU 32 returns to step S1 and executes the update processing again in order to confirm that the output oil pressure of the operating oil is within the target pressure range.

Note that, the upper limit value of the target pressure range is set to an appropriate value by using the biasing force of return spring 14 as a reference. For this reason, ECU 32 repeatedly executes steps S1 to S5 and S7 to S8 as necessary to adjust the application time of the pulsed control current on control map 32a to an appropriate value.

ECU 32 is capable of adjusting the output oil pressure of the operating oil to be within the target pressure range in filling step t1 by the processing in S1 to S8 described above. That is, as a result, control map 32a can be updated such that good shifting feeling can be obtained while shortening a shifting time when actually performing the shifting process-ing.

Effects

As described above, a hydraulic control apparatus of an automatic transmission according to the present embodi-ment includes:

an electromagnetic proportional valve that is disposed in a hydraulic circuit and performs pressure regulation of operating oil supplied to a hydraulic clutch;

a pressure sensor that detects an oil pressure of the operating oil supplied to the hydraulic clutch; and a control apparatus that executes filling of the hydraulic clutch with the operating oil and causes the hydraulic clutch to transition from an opened state to an engaged state by outputting, according to a control map stored in advance, a pulsed control current having a predetermined current value and a predetermined application time to the electromagnetic proportional valve.

The control apparatus performs correction processing of correcting the predetermined current value and the prede-termined application time, which are stored in the control map, at a predetermined timing such that the oil pressure of the operating oil supplied to the hydraulic clutch is within a predetermined target pressure range when the control appa-ratus outputs the pulsed control current to the electromag-netic proportional valve.

Accordingly, it is possible to appropriately adjust the shifting feeling even in a case where the state of operation targets (for example, the hydraulic clutch and the electro-magnetic proportional valve) changes due to deterioration over time or even in a case where there are individual variations during manufacturing of the operation targets (for example, the hydraulic clutch and the electromagnetic pro-portional valve).

In particular, the hydraulic control apparatus of the auto-matic transmission according to the present embodiment makes it possible to operate the electromagnetic propor-tional valve with the pulsed control current, in which the current value and the application time are appropriately set, to fill the hydraulic clutch with the operating oil in a short time, and thus, it is also possible to achieve a short-time shifting operation at all times.

Variation

In the above-described embodiment, an aspect has been indicated in which the control map update processing illus-trated in FIG. 3 is executed as an opportunity to receive a control map correction instruction from the driver of the vehicle.

In this regard, as described above, since the parts consti-tuting hydraulic clutch 11, electromagnetic proportional valve 10, and the like deteriorate over time, there is a concern that the shifting feeling may change to a defective state without the driver's awareness due to deterioration over time of these parts.

In consideration of such a viewpoint, hydraulic control apparatus 1 (ECU 32) according to the present variation determines, based on an acceleration fluctuation of the vehicle or a rotation fluctuation of the vehicle axle of the vehicle, which is detected during the shifting operation of the automatic transmission, whether the shifting operation of the vehicle is in an abnormal state, and performs the correction processing (see FIG. 3) to resolve the abnormal state in a case where the shifting operation of the vehicle is in the abnormal state.

Normally, during the shifting operation of the automatic transmission, hydraulic clutch 11 is in the half-clutch state after filling step t1 is completed, and the engine receives a load from the output shaft. For this reason, the engine rotation speed decreases.

Thereafter, during pressure-decreasing step t2, the half-clutch state of hydraulic clutch 11 continues. Then, in pressure-increasing step t3, the engaged state of hydraulic clutch 11 is completed, and a large load from the output shaft is applied to the engine. That is, accompanied therewith, the engine rotation speed further decreases.

Here, assuming a case where characteristics of hydraulic clutch 11, electromagnetic proportional valve 10, and the like change, a change in the behavior of the engine rotation speed occurs.

For example, when the output oil pressure of the operating oil supplied to hydraulic clutch 11 in filling step t1 is too low, a state in which the half-clutch state is not completed is reached even when filling step t1 is completed, and thus, the engine rotation speed almost does not change. In addition, in this case, hydraulic clutch 11 is engaged in a forced manner during pressure-increasing step t3, and thus, the engine rotation speed rapidly decreases in pressure-increasing step t3.

On the other hand, for example, when the output oil pressure of the operating oil supplied to hydraulic clutch 11 in filling step t1 is too high, hydraulic clutch 11 transitions in a forced manner to the engaged state during filling step t1, and thus, the engine rotation speed rapidly decreases during filling step t1.

In addition, in such a situation, a torque shock (that is, an acceleration fluctuation) occurs in filling step t1 or pressure-increasing step t3.

From such a viewpoint, ECU 32 according to the present variation detects a change in the acceleration of the vehicle or the rotation speed of the vehicle axle during the shifting operation of the automatic transmission, and determines based on an aspect of the change whether the shifting operation of the vehicle is in the abnormal state. The sensor used at this time may be any sensor capable of detecting the acceleration of the vehicle or the rotation speed of the vehicle axle. As this type of sensor, for example, a clutch output rotation speed sensor, a gear input rotation speed sensor, a transmission output rotation speed sensor, a propeller shaft rotation speed sensor, an acceleration sensor, or the like, which is mounted in the vehicle, can be used.

Note that, at this time, ECU 32 may store in advance, in the storage section, reference data according to a standard behavior for the behavior of the acceleration of the vehicle or the rotation speed of the vehicle axle during the shifting operation of the automatic transmission, and may determine an abnormality in the behavior of the acceleration of the vehicle or the rotation speed of the vehicle axle in comparison with the reference data.

As described above, hydraulic control apparatus 1 of the automatic transmission according to the present variation makes it possible to execute the control map update processing automatically at an appropriate timing.

Although specific examples of the present invention have been described in detail above, these are merely examples and do not limit the scope of claims. The technology described in the scope of claims includes various modifications and changes of the specific examples exemplified above.

INDUSTRIAL APPLICABILITY

The hydraulic control apparatus according to the present invention allows appropriate adjustment of feelings during shifting.

The invention claimed is:

1. A hydraulic control apparatus of an automatic transmission that performs shifting of a vehicle by engaging and opening a hydraulic clutch, the hydraulic control apparatus comprising:
    an electromagnetic proportional valve that is disposed in a hydraulic circuit and performs pressure regulation of operating oil supplied to the hydraulic clutch;
    a pressure sensor that detects an oil pressure of the operating oil supplied to the hydraulic clutch; and
    a control apparatus that executes filling of the hydraulic clutch with the operating oil and causes the hydraulic clutch to transition from an opened state to an engaged state by outputting, according to a control map stored in advance, a pulsed control current having a predetermined current value and a predetermined application time to the electromagnetic proportional valve, wherein
    the control apparatus performs correction processing of correcting the predetermined current value and the predetermined application time at a predetermined timing such that the oil pressure of the operating oil supplied to the hydraulic clutch is within a predetermined target pressure range when the control apparatus outputs the pulsed control current to the electromagnetic proportional valve, the predetermined current value and the predetermined application time being stored in the control map.

2. The hydraulic control apparatus according to claim 1, wherein
    the predetermined target pressure range is set using, as a reference, a pressure against a biasing force of a return spring of the hydraulic clutch.

3. The hydraulic control apparatus according to claim 1, wherein
    the correction processing includes:
        first processing of increasing the predetermined current value stored in the control map such that the oil pressure of the operating oil detected by the pressure sensor becomes higher than a lower limit value of the predetermined target pressure range when the pulsed control current is output to the electromagnetic proportional valve; and
        second processing of decreasing the predetermined application time stored in the control map such that the oil pressure of the operating oil detected by the pressure sensor becomes lower than an upper limit value of the predetermined target pressure range when the pulsed control current is output to the electromagnetic proportional valve, and
    the control apparatus executes, in the correction processing, the second processing after executing the first processing.

4. The hydraulic control apparatus according to claim 1, further comprising an oil temperature sensor that detects a temperature of the operating oil supplied to the hydraulic clutch, wherein:
    the predetermined current value and the predetermined application time of the pulsed control current are stored in association with the temperature of the operating oil in the control map, and
    the control apparatus acquires, in the correction processing, the temperature of the operating oil detected by the oil temperature sensor, and corrects, on the control map, the predetermined current value and the predetermined application time which correspond to the temperature.

5. The hydraulic control apparatus according to claim 1, wherein:
    the control apparatus determines, based on an acceleration fluctuation of the vehicle or a rotation fluctuation of a vehicle axle of the vehicle, whether a shifting operation of the automatic transmission is in an abnormal state, the acceleration fluctuation or the rotation fluctuation being detected during the shifting operation of the automatic transmission, and
    the control apparatus performs the correction processing in a case where the shifting operation of the automatic transmission is in the abnormal state.

6. The hydraulic control apparatus according to claim 1, wherein when the control apparatus changes the hydraulic clutch from the opened state to the engaged state, the control apparatus is configured to sequentially execute:

a filling step of filling the hydraulic clutch with the operating oil by outputting the pulsed control current to the electromagnetic proportional valve, a pressure-decreasing step of decreasing the oil pressure of the operating oil by decreasing a current value of a control current output to the electromagnetic proportional valve such that the current value in the pressure-decreasing step becomes smaller than the predetermined current value in the in the filling step, and a pressure-increasing step of increasing the oil pressure of the operating oil such that the oil pressure becomes higher than the oil pressure in the filling step, by increasing a current value of a control current output to the electromagnetic proportional valve such that the current value in the pressure-increasing step becomes larger than the current value in the pressure-decreasing step, and by applying a stepped or ramped control current, to complete the engaged state of the hydraulic clutch.

7. A vehicle, comprising the hydraulic control apparatus according to claim 1.

* * * * *